United States Patent
Saadat

[11] Patent Number: 5,484,181
[45] Date of Patent: Jan. 16, 1996

[54] GRIPPER MECHANISM

[76] Inventor: Mohsen M. Saadat, 219 Cherry St., Katonah, N.J. 10536

[21] Appl. No.: 140,165
[22] PCT Filed: May 7, 1992
[86] PCT No.: PCT/EP92/01002
  § 371 Date: Oct. 28, 1993
  § 102(e) Date: Oct. 28, 1993
[87] PCT Pub. No.: WO92/20496
  PCT Pub. Date: Nov. 26, 1992

[30] Foreign Application Priority Data

May 15, 1991 [DE] Germany ........................ 41 15 912.8
Mar. 4, 1992 [DE] Germany ........................ 42 06 708.1

[51] Int. Cl.$^6$ .................................................. B66C 1/42
[52] U.S. Cl. .................. 294/88; 294/97; 294/115
[58] Field of Search ................... 294/88, 93, 97, 294/115, 86.24; 901/36, 37; 414/917

[56] References Cited

U.S. PATENT DOCUMENTS 3,051,327 8/1962 Goodell et al. .
4,507,045 3/1985 Valentine et al. .
4,627,654 12/1986 Van Oost ........................... 294/88 X
4,665,558 5/1987 Burke .
4,686,870 8/1987 Mack .

FOREIGN PATENT DOCUMENTS

0205141 12/1986 European Pat. Off. .
0309613 4/1989 European Pat. Off. .
2361973 6/1975 Germany .
3441643 5/1986 Germany .
3529592 3/1987 Germany ........................... 294/97
1576469 7/1990 U.S.S.R. ........................... 294/97

Primary Examiner—Dean Kramer
Attorney, Agent, or Firm—Martin A. Farber

[57] ABSTRACT

The invention relates to a gripper mechanism for a manipulator or the like, having at least one movable gripper finger (6) swingable around a slide axis, as coupler of a kinematically multi-member positive guide mechanism (1, 2, 3, 4, 5, 6), which contains at least one slider/crank mechanism (1, 2, 3, 4) as actuating unit which has a crank (2) acting at one end on a first link (3) and pivoted at the other end on a slide rod (1), and a slide (4) which is guided on the slide rod (1) and abuts against the first link (3), a second link (5) being supported axially displaced therefrom on the slide (4) and both links (3, 5) of the guide mechanism acting on the gripper finger (6), the slide rod (1) carrying out no movement in the direction of the slide axis upon the movement of the gripper, and its strives for and achieves a flexurally as well as torsionally stiff development of such a gripper mechanism by a slide rod (1) which is formed of several decentrally arranged rods (7) as cage.

14 Claims, 9 Drawing Sheets

_Fig. 19_

_Fig. 20_

_Fig. 21_

Fig. 22

GRIPPER MECHANISM

FIELD AND BACKGROUND OF THE INVENTION

The present invention relates to a gripper mechanism for a manipulator or the like in accordance with the preamble to claim 1.

Such a gripper mechanism is described in Federal Republic of Germany Patent 34 41 643.9. In that case, the gripper finger is guided as coupler of a six-member positive guide mechanism. The six-member guide mechanism consists of the combination of a special slider/crank mechanism, an equal-sided link quadrilateral, a special link quadrilateral, a link parallelogram in the manner that the slide of the slider/crank mechanism and the gripper finger together form two opposite links of the link quadrilateral. The slide link of the slider/crank mechanism and the drive of the gripper mechanism together form a single unit, the slide rod of the drive unit not carrying out any movement in the direction of the slide axis with respect to the gripper housing or frame.

In the invention according to Federal Republic of Germany Patent 34 41 643.9, the single slide rod of the centrally arranged drive unit serves as attachment member for the robot arm. This rod must extend through the movable cylinder and take up the entire lateral loads on the gripper, including the weight of the object as well as the dynamic transverse and torsional forces which are produced upon the transport and rotation of the object, and transmit them to the robot arm. In this way, this gripper mechanism is of very limited load-bearing capacity. It is torsionally and flexurally weak and, in the case of objects of greater weight, loses stability and precision of positioning.

Another gripper mechanism is known from EP 0 15 32 11. In that case, the gripper finger is guided on the frame as link of a six-member positive guide mechanism. The link of a link parallelogram which is opposite the gripper finger is driven by slide rod of a slide link which serves as actuating unit. In this connection, the gripper finger travels linearly up and down perpendicular to the slide axis along a guide plate which is fastened to the frame. In the case of the actuating unit, the slide rod is arranged centrally and movably and the cylinder is fixed on the frame.

SUMMARY OF THE INVENTION

In contradistinction to this, the object of the present invention is to make a gripper mechanism of this type flexurally and torsionally stiffer.

This object is achieved in accordance with the invention by the features set forth in claim 1.

The dependent claims contain advantageous further embodiments of the invention.

As a result of the development of the slide rod in the form of a cage which is formed of several decentrally arranged rods, a widening in cross section of the guiding and holding members of the gripper mechanism is obtained with simple means. In this connection it is advantageous if the slider is arranged as a carriage which extends along the rods and slides on the rods. By this arrangement an exact guidance of the slider is made possible, which, in its turn, imparts additional transverse and flexural stiffness to the rods. Another advantageous embodiment of the invention provides that, at the ends of the rod, clamping plates are arranged which make it possible to prestress the rods. In this connection, the rods can be prestressed either in compression or in tension. By this prestressing, a considerable increase in flexural and torsional stability of the cage is obtained. In order to obtain a prestressing of the rods in tension, they can be made hollow. In this case, the prestressing can be obtained by a prestressed threaded rod placed into the hollow rods. The movement of the slide relative to the slide rod can be obtained with a cylinder-piston arrangement. In this case, there is preferably arranged within the cage a piston rod with a stationary piston arranged in a cylinder associated with the slide. The movement of the cylinder relative to the piston is preferably controlled by pressure fluid. The feed of the pressure fluid to the cylinder is preferably developed by the hollow rods. In a preferred further development of the invention, a body is clamped between the clamping plates, in which case the tensioning of the rods stressed in tension can be obtained. The body is advantageously arranged centrally between the rods and developed as a hollow body. In this case, it can also be provided that the body forms the piston on which the cylinder developed by the slide travels. The development of the body as hollow body on the one hand saves weight and on the other hand affords the possibility of laying the pressure-fluid feed lines in the hollow body or of utilizing the hollow body itself as pressure-fluid feed line.

The gripper mechanism in accordance with the invention has, in its simplest arrangement, a single six-member guide mechanism which moves a gripper finger as coupler of a link quadrilateral by the movement of translation of the slide from the slide link of a slider/crank mechanism back and forth relative to the slide axis. In this arrangement, the second gripper finger is arranged immovably on the front clamping element of the slide rods, which consist of at least two rods.

The guide mechanism of the gripper finger can consist of a combination of a slider/crank mechanism and a link quadrilateral in the manner that the gripper finger represents the coupler of the link quadrilateral and a member of the link quadrilateral adjacent the gripper finger represents the coupler of the slider/crank mechanism. The member of the link quadrilateral opposite the gripper finger is the slide of the slider/crank mechanism. Thus, the link quadrilateral and the slider/crank mechanism have two members in common and the guide mechanism has a total of six mechanism members, six swivel joints and a slide joint, the slide joint serving as drive of the guide mechanism and the slide rod serving as frame.

By suitable determination and establishing of the dimensions of the mechanism, the gripper finger, during its upward and downward movement, can also incline itself as desired in clockwise and counterclockwise direction within wide limits also in its plane of motion, which passes through the slide axis and is perpendicular to the axes of the swivel joints so as to adapt itself, for instance, to the shape of the object to be manipulated.

The slide rod is advantageously decentrally arranged and developed in several parts. The individual rods, at least two, are connected together at their ends by means of clamping elements or clamping plates in such a manner that they extend parallel to each other and, jointly with their end clamping plates, together form a closed cage which serves as frame or housing for the gripper mechanism and is fastened by its rear clamping plate to the robot arm or manipulator.

This cage construction imparts the slide rod, in accordance with the invention, very great stiffness to torsional and flexural moments and permits a light construction, such as is necessary for manipulators for heavy loads and faster speeds. Furthermore, the cage construction frees the inside of the slide link for other tasks such as, for instance, for the attachment of cameras for the positioning of the gripper, the attachment of sensors of all kinds or else for the attachment without transverse force of a drive unit actuated by electric motor or by cable line.

In order to obtain even greater flexural and torsional stiffness of this cage, the slide rods are prestressed in tension or compression by means of the clamping plates arranged on both sides, in the manner for instance that the slide rods are made hollow like a tube and a pull rod, for instance a threaded rod, is passed through the hollow inner space and tightened with lock nuts against the two clamping plates.

The tension and compression rods can also be arranged outside the bores of the slide rods if said hollow spaces are used for other purposes such as, for instance, the passage of compressed air, oil, cables, hoses or the like.

In the event of a plurality of slide rods they can be prestressed by turns or alternately in tension and compression and also themselves serve as tension and compression rods in the manner that they are hardened and ground in their central region for guidance of the carriage and provided with threads on their ends.

The front and rear clamping plates of the slide rods are preferably made of prefabricated light-metal shaped sections and have on their circumference profile-like fastening possibilities for both rapid attachment to the robot arm in the case of the rear plate and for rapid application of finger mechanisms on the front plate.

The slide of the slide joint, which slides as carriage on the slide rods, is preferably also made of a light-metal shaped section in the form of an extruded section and has on its circumference the same possibilities of attachment in the form of attachment grooves as the front clamping plate of the slide rods has.

The slide has a geometrical shape which, depending on the purpose of the gripper and the number of required gripper fingers and their geometrical arrangement, may be of different appearance in cross section. It can be developed as a rectangle, triangle, pentagon, hexagon, octagon, ellipse, or circle. On its circumference, it has the same profile structure as the front clamping plate of the slide rods.

The slide can have, in cross section, at least as many continuous, non-centrally arranged bores as there are individual slide rods. By these bores, it surrounds the slide rods either entirely, i.e. 360°, or even merely partially, i.e. less than 360°, and imparts to the cage construction of the slide rods very great additional transverse and torsional stiffness since the slide rods cannot bend within the bores of the slide.

At the beginning and end of the bores of the slide, there are preferably inserted either plain-bearing or antifriction-bearing bushings with or without seals, in order to permit a low-friction sliding of the slide as carriage on the slide rods.

The hollow space between the slide rods, the inner wall of the bores of the slide and the two bearings at the beginning and end of the bore is preferably placed under oiled compressed air in order, on the one hand, continuously to lubricate the bearing and, on the other hand, to prevent particles of dust and dirt from entering into the bearings. The compressed air can pass via a small bored hole arranged in the cylindrical wall of the hollow slide rod into the hollow space between the bearings.

The space in the middle of the slide is free and is suitable for the arrangement of actuating units of any kind. These actuating units can then exercise their force exclusively in axial direction, i.e. in direction parallel to the slide rods on the front or rear clamping plate of the slide rods in order to move the slide back and forth. A coupling or a ball joint on the front or rear clamping plates sees to it that the forces acting on the slide rods are not transmitted to the drive shaft or drive rod of the actuating unit.

The drive unit or units can also be developed directly in the bores of the slide in which the slide rods are guided in the manner that piston rings are present fixed in space on these slide rods in the bores of the slide, said piston rings dividing the cylindrical hollow space between the bore inner surface, slide-rod outer surface and the ends of the bearings on the two sides into two spaces. One of these half spaces is in communication by a small bored hole in the outer surface of the hollow slide rod with the hollow space of the slide rod, through which hole compressed air for the actuating of the slide is fed for instance from the outside. Thus, the one slide rod serves for instance to actuate the slide in forward direction and the other slide rod serves to actuate the same slide in rearward direction. In the case of a plurality of slide rods, these tasks can be assumed jointly by several slide rods in order to increase the gripping force.

In the event of a plurality of slide rods, the slides can be developed in multipartite form so that each part slides by itself on, for instance, two slide rods and is also actuated by them. In such case, each individual slide moves a gripper finger separately, independently of the other gripper fingers. A slide having six slide rods can, for instance, be divided in its direction of slide into three parts, each part being guided on two slide rods and being actuated by them, and actuate three gripper fingers independently of each other.

In accordance with the invention, a very elegant and powerful solution is obtained if the bores of the slide in which the slide rods are guided are combined in the form of a hollow cylinder, the individual pistons are developed to form one large annular piston, and the individual bearings to form one large annular bearing with a corresponding number of bores for the passage of the slide rods. A gripper mechanism developed in this manner has, within a very small space, both great stiffness to torsion and flexure and a large piston surface, which can develop a correspondingly large activating force. It is hollow in large volume in its center and affords a great deal of space for other tasks. The pressure fluid either passes as described over the hollow slide rods or else over the hollow inside of the slide through elastic conduits.

The hollow inside of the slide may be in the shape of a circular cylinder or else in the shape of a polygonal cylinder. Since the slide is made preferably from light-metal extrusions, practically any desired cross-sectional shape can be realized. Thus, for instance, the shape of the human hand with four fingers on the one side and one finger on the opposite side can easily be realized on an elliptically shaped slide. Furthermore, individual finger actuation is possible by the splitting up of the slide as described.

The pistons of the actuating cylinders are preferably provided with magnet rings in order, by means of magnet switches or sensors, to determine without contact the position of the slide or slides and note therefrom the position of the gripper fingers.

For an electromotive drive with electric motor integrated in the slide, a threaded spindle is clamped firmly between the two clamping elements of the slide rods parallel to the latter. The slide rods can be arranged centrally or else eccentrically. The hollow rotor of the electric motor which has an internal thread travels over the threaded spindle. The rotor is turnably mounted in the slide and is placed in rotation by the stator windings present in the slide.

The rotor of the electric motor can also be arranged transverse to the slide rods and act by a pinion on a rack which is located parallel to the slide rods in order, together with the slide, to move back and forth on the slide rods.

If an electric motor with an incremental transmitter connected to it is used, the position of the slide is recognized at the same time and the opening of the gripper determined therefrom. With the use of a stepping motor, a given width of opening of the gripper can be controlled as desired.

In accordance with the invention, for the modular application of the finger mechanisms, attachment possibilities such as, for instance, longitudinal or transverse grooves are provided on the slide joint of the gripper as well as on the front clamping element or clamping plate of the slide rods as well as on the carriage or slide of the slide joint, into which grooves the mating attachment piece of the finger mechanisms engage or to which they are fastened by means of detachable connections.

The finger mechanisms consist of the six-member guide mechanisms of the combination of a link quadrilateral with a slider/crank mechanism, in which connection, instead of the slide joint, two or three preferably identical fastening elements are connected by swivel joint with the remaining mechanism members, which are fastened by screws and slide blocks to the grooves of the slide and the front clamping plate of the slide rods.

The gripper finger is preferably made of light-metal extrusions. This extrusion also has attachment grooves for the application of the required joint parts of the guide mechanism as well as for the application of additional gripper jaws. The gripper finger is itself a link of the guide mechanism, its length being variable by displacement of the joint parts, referred to in the following as joint support. Also the distance between the two joint supports which are fastened on the slide is variable. In this way the kinematics of the gripper finger as well as the transmission ratio between the drive force and the gripping force on the gripper finger is impaired and adjusted as desired.

The other links of the guide mechanism are also made of prefabricated shaped sections, preferably light-metal extrusions, insofar as possible from the same sectional shapes.

The object of the articulated connection of the gripper finger to the links of the link quadrilateral as well as that of the articulated connection of the links of the guide mechanism to the separate slide joint is assumed by a joint support which is also preferably made of light-metal extrusions.

For the articulated connection of the crank of the slider/crank mechanism with its coupler, a corresponding cutout is prestamped in the structural shape of the coupler. The bore holes of the joints of the links, the attachment grooves as well as the bores and fastening grooves of the slide joint of the six-member guide mechanism of the gripper mechanism are all preferably already prefabricated upon the manufacture of the shaped sections so that subsequent time-consuming, expensive machining is unnecessary.

Thus, practically all parts of the gripper mechanism of the invention can be made of light-metal extrusions. A gripper mechanism designed in this manner can be produced very economically in mass production. It is very stable and nevertheless very light in itself and thereby makes it possible for the robot to handle a greater weight.

The modular construction makes it possible to expand the number of fingers of such a gripper mechanism at any time by the applying of additional finger mechanisms or else to reduce the number of fingers of such a gripper, possibly for other tasks.

For greater lateral stability of the gripper fingers they are guided laterally by plain bearings or antifriction bearings between elements which are fastened to the front and/or rear clamping elements of the slide rods and/or to connecting rods between these two plates and do not move relative to the frame or housing of the gripper.

A gripper mechanism constructed in this manner has the lateral stability of a solid gripper and the advantages of the link mechanism, such as the very large range of the width of opening, exclusively swivel joints on the gripper finger and thus no danger of jamming with gripper fingers of too great a length, as well as variable gripping force as a function of the width of opening of the gripper finger.

Of course, the cranks of the slider/crank mechanism can also be fastened on the rear clamping plate of the slide rods rather than on the front clamping plate. There is no change in the kinematics of the finger mechanism as a result of this. The gripper finger is merely made somewhat longer by this and more yieldable with respect to its flexural stiffness and lateral stability.

The invention thus represents a gripper mechanism of diversified use which, with a minimum weight of its own, can handle heavy objects within a relatively large range of diameters and with practically any number of gripper fingers in any desired geometrical arrangement and, in addition, be manufactured at relatively low cost.

A measure which increases the flexural and torsional stiffness is assured by the further development in which a central clamping body is clamped between the two clamping plates. Preferably, the clamping body has an elongated hollow cylindrical form, and passes through the carriage which is translatable relative to the clamping body. The clamping body is, in this connection, preferably stressed in compression, the corresponding tensile forces coming from the rods which are prestressed in tension. However, a reverse action of force is also provided in the manner that the central clamping body is stressed in tension, for instance in the manner that corresponding clamping screws are provided and the rods are subjected to compression. If the clamping body is hollow, a saving in weight is thus obtained on the one hand, while, on the other hand, the hollow space, however, can also be used to arrange therein parts such as, for instance, cables, sensors, cameras or hoses, so that they do not rub against the slide upon its movement and become possibly damaged. In this connection, the rear and front clamping plates have corresponding passage holes. The outer surface of the clamping body can be used as inner surface of an annular cylinder which serves as actuating unit of the slide joint and thus of the gripper mechanism. The annular cylinder is formed within the carriage, encircles the clamping body, and receives an annular piston held by the clamping body. In this case, the annular piston of the annular cylinder is fastened to the clamping body and the two annular end pieces of the end surfaces of the annular cylinder are fastened to the slide or carriage. Of course, the annular piston can also be fastened to the slide or carriage and the annular end piece of the end surfaces of the annular cylinder to the clamping body.

The invention will be described in further detail below with reference to the diagrammatic figures of the drawing. Members which correspond to or are equivalent to each other kinematically are provided with the same reference numerals. The added alphabetic letters designate the same part in the different embodiments.

DETAILED DESCRIPTION OF THE PREFERRED EMBODIMENTS

Figure 1:
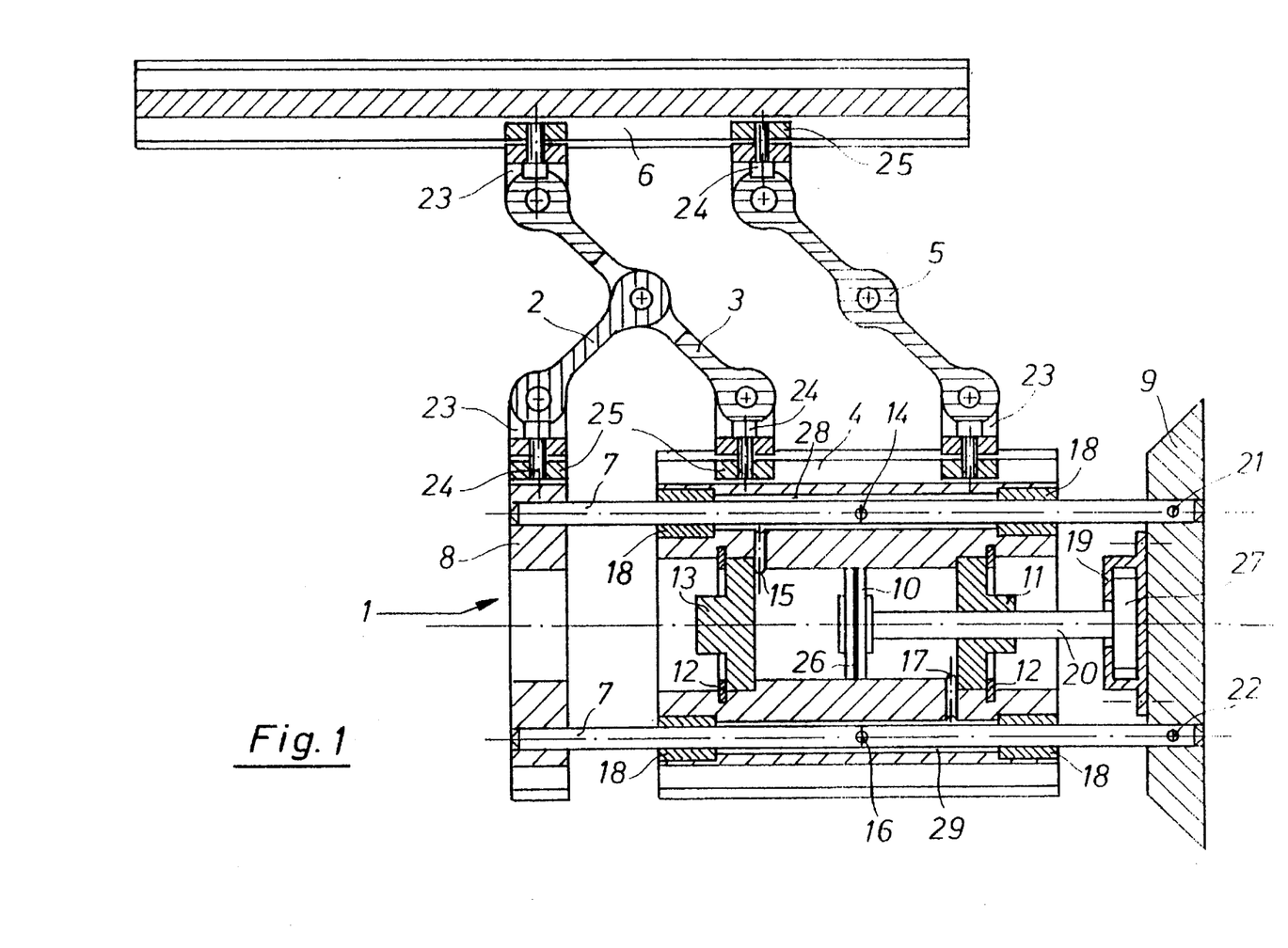
FIG. 1 is a longitudinal section through a gripper mechanism in accordance with the invention, showing a single finger mechanism with pneumatic or hydraulic actuating unit integrated in the slide.

Referring to FIG. 1, several, at least two, slide rods 7 are fastened parallel to each other at their two ends by means of clamping plates 8 and 9 in such a manner that together the rods 7 and plates 8, 9" form an assembly 1 of slide rods in the form of a cage for the slide 4. The slide 4 slides by means of plain or anti-friction bearings 18 over or between the rods 7.

The rods 7 can be stressed in tension or compression in order further to stiffen the cage construction 7, 8, 9 of the slide rod assembly 1. The rods 7 are preferably hollow so that a threaded rod 100 (FIG. 2) can be passed through an individual one of them for the prestressing, said rod being then locked against the two clamping plates 8 and 9.

The front clamping plate 8 of the rods 7 is hollow in its center. This space serves for the arrangement of other elements such as, for instance, sensors, shock absorbers, optical components, cameras, or the like. The front clamping plate 8 has possibilities on its circumference for attachment, such as, for instance attachment grooves for the connection of the crank 2 of the slider/crank mechanism 1, 2, 3, 4, by means of joint supports 23, slide blocks 25, and screws 24. The front clamping plate 8 can be triangular, quadrangular, pentagonal, hexagonal, polygonal, round or elliptical in cross section. On its periphery, it has as many possibilities of attachment for the application of finger mechanisms 2, 3, 5, 6, 23, 24, 25 as the gripper mechanism requires gripper fingers and it is preferably cut from a prefabricated light-metal or plastic sectional shape.

The rear clamping plate 9 of the rods 7 is also preferably sawn from a light-metal or plastic sectional shape and serves, on the one hand, for the attachment of the rods 7 and, on the other hand, for the attachment of the gripper mechanism to the arm of the robot or to the manipulator and for the conducting of the pressure fluid to the rods 7. The center of this plate is generally also hollow and can serve for the passage of cables, hoses, and the like. On the periphery of the clamping plate 9 bevels or grooves are provided which permit rapid mounting or removal and replacement of the gripper mechanism on the robot arm.

Over the rods 7 or between them, i.e. supported on them, the slide 4 slides back and forth along the axes of the rods 7 and moves the gripper fingers up and down perpendicular to the axis of the rods 7.

The slide 4 is preferably made of a light-metal or plastic shaped section. Its cross-sectional shape corresponds on its periphery to the shape of the front clamping plate 8 and has exactly as many possibilities of attachment for the finger mechanisms as the front clamping plate 8. On the periphery of the slide 4 there are fastened two links 3, 5 of the link quadrilateral 3, 4, 5, 6, by means of joint supports 23, sliding blocks 25, and screws 24. The attachment is effected by rapid mounting on the grooves provided for this on the periphery of the slide 4, the distance between the points of attachment of the links 3 and 5 on the slide or carriage 4 being variably adjustable. In this way, the kinematics of the gripper is influenced.

The center of slide 4 is hollow. This hollow space is developed as a cylinder for pneumatic or hydraulic actuation. Within it, there is contained the piston 10 which acts by means of piston rod 20 in axially immovable but—as a result of the coupling 19, 27—radially displaceable manner on the rear clamping plate 9. The piston rod 20 can also act on the front clamping plate 8. Instead of the coupling 19, 27, the piston rod 20 can also act directly or indirectly by means of a ball joint on the front clamping plate 8 or rear clamping plate 9. Thus, the forces and movements of the gripper mechanism which occur do not act radially on the piston rod 20 of the actuating unit.

Over the piston 10 of the actuating unit there is a magnetic ring 26 which, at given positions of the slide, actuates the reed switches, approximation switches, magnetic switches or sensors arranged on the outer surface of the slide 4, preferably in the attachment grooves of the finger mechanisms, and thus provides the central control with a signal for the position of the slide 4 and for the width of opening of the gripper fingers 6.

The cylindrical space of the actuating unit is sealed at both its ends by two identical parts or plugs 11, 13, the one part 11 containing a bore hole for the passage of the piston rod 20, which hole need not be arranged centrally.

The pressure fluid, for instance oiled compressed air, passes via connecting holes (not shown) in the rear clamping plate 9 through the bores 21, 22 into the hollow rods 7 and from there, via the bores 14 and 16, into the hollow spaces 28 of the rod support, lubricates the rods 7 there in the region of wear between the bearings 18, and passes from there via the bore holes 15 and 17 into the cylindrical spaces. The piston 10 does not move axially relative to the slide rod 1 and the plugs 11 and 13 are secured on the slide 4 by retaining rings 12. In this way, the slide 4 travels in one direction or the other.

The crank 2 of the slider/crank mechanism 1, 2, 3, 4 is preferably made of a light-metal or plastic shaped section. Its one end engages in turnable manner on the joint support 23, which is fastened to the front clamping plate 8. The other end of the crank 2 acts rotatably approximately centrally on the coupler 3.

The coupler 3 and the link 5 are preferably both made from the same light-metal or plastic shaped section, the coupler 3 being provided, approximately on its center, with a recess intended for the pivoted connection of the crank 2.

The two links 3, 5 are pivotally connected at their total of four ends to the joint supports 23. The joint supports 23 are connected in pairs, fixed but adjustable, to the slide 4 and gripper finger 6.

The bore holes, fastening grooves and recesses for the attachment of the links and other parts as well as for the joints are preferably already prefabricated upon the production of the shaped sections, so that practically no subsequent machining is necessary.

The gripper finger 6 is preferably made of a light-metal or plastic shaped section. On its periphery it has attachment grooves which serve for the rapid attachment of additional jaws and for the application of the joint supports 23 of the links 3 and 5 of the link quadrilateral 3, 4, 5, 6.

In this way, in accordance with the invention, the entire finger mechanism, consisting of the links 2, 3, 5 and the gripper finger 6, can be premounted by means of joint supports 23 as a finger module and, if necessary, applied modularly to the slide joint 1, 5 by means of the slide blocks 25 and screws 24.

The slide 4 can, of course, also be moved relative to the slide rod 1 by means of an electric drive by a worm gear or by a pinion and rack.

In order to reduce the weight of the gripper mechanism or for the use of the gripper mechanism in corrosive or hot media, i.e. wherever the drive cannot be arranged in the gripper itself, the slide bar 4 is moved back and forth by means of a rope or belt drive.

Figure 2:
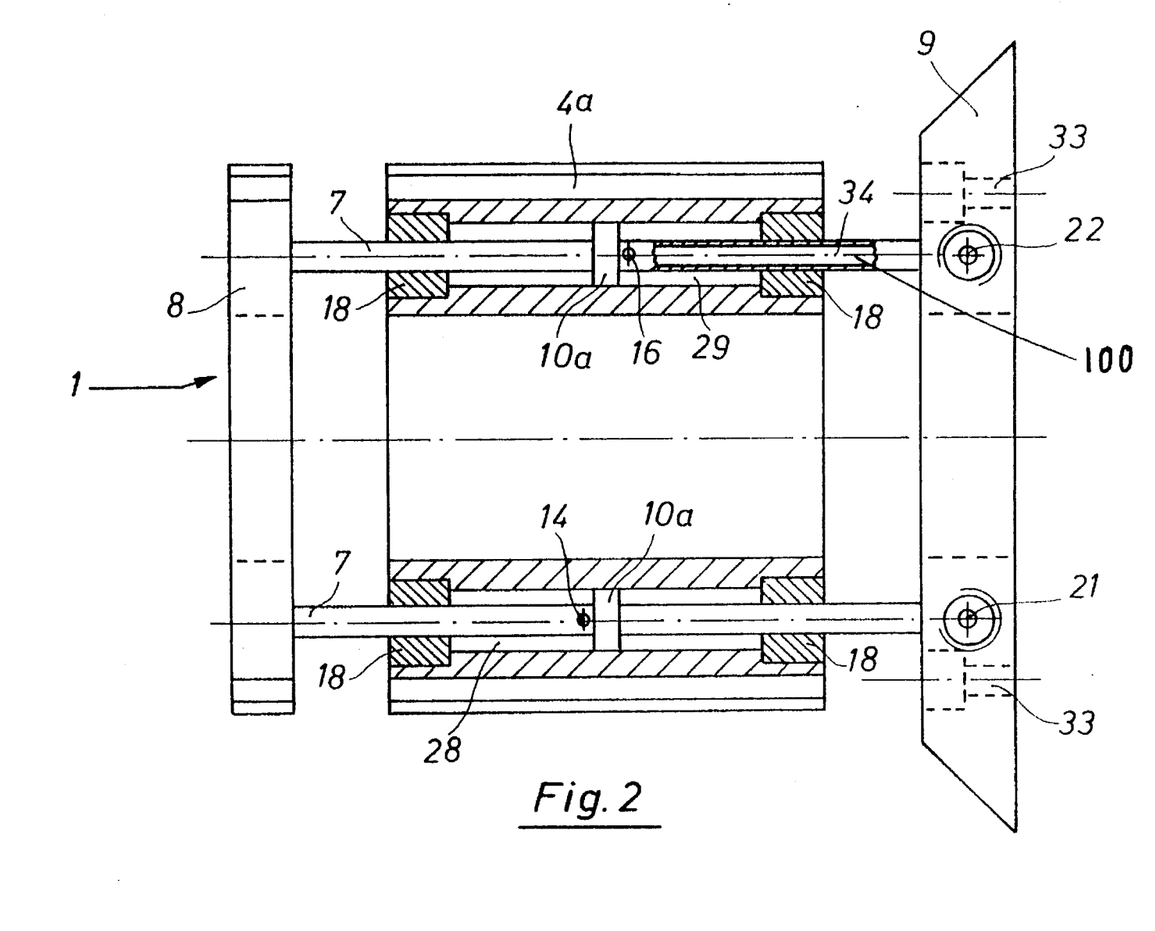
FIG. 2 is a longitudinal section through the slide joint of the gripper mechanism of the invention.

FIG. 2 is a longitudinal section through the slide 4a of the slide joint 1, 4a of the gripper mechanism of the invention.

In accordance with the invention, the slide rod 1 consists of the rods 7 and the two clamping plates 8 and 9. The slide 4a slides over the rods 7. The slide surfaces of the slide 4a on the rods 7 are formed by the anti-friction or plain bearings 18.

In accordance with FIG. 2, the cylindrical hollow spaces 28, 29 between the bearings 18 are divided in two by the piston 10a which is fastened to the rods 7. The cylindrical spaces 28, 29, together with the rods 7, bearings 18, and piston 10a, form the actuating units of the slide 4a relative to the slide rod 1.

Instead of the individual bore holes 28, 29, a cylindrical hollow space can be formed in the slide 4a through which space the rods 7 pass. In such case, the two bearings 18 and the single piston 10a are of annular shape. While the piston ring 10a connects all rods 7 together, the two bearing rings 28 have a corresponding number of bore holes for the passage of the rods 7.

For the actuating of the slide 4a, the pressure fluid passes via the connections 21 and 22 through the hollow spaces 34 of the rods 7 via the bore holes 14 and 16 into the cylindrical or hollow-cylindrical spaces 28 and 29 and moves the slide 4a back and forth.

Figure 3:
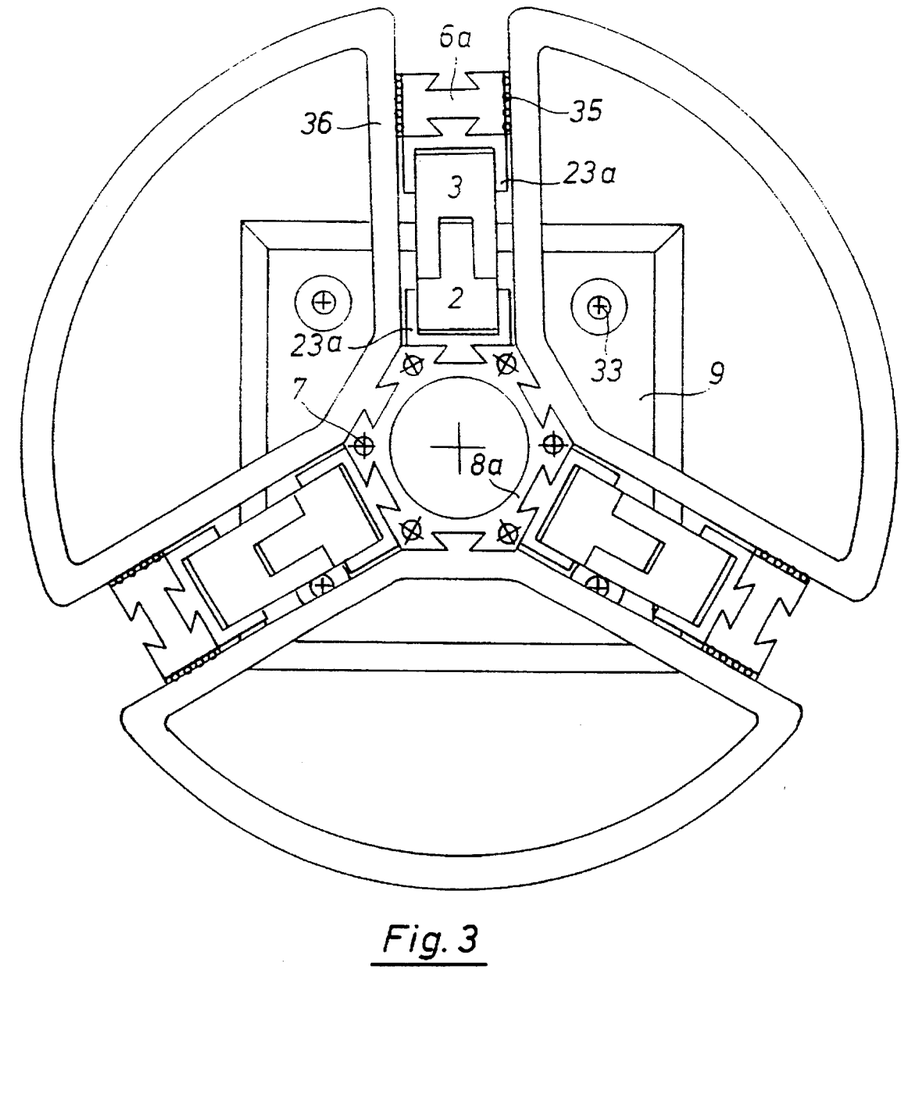
FIG. 3 is a front view of a gripper mechanism in accordance with the invention having three laterally guided gripper fingers.

FIG. 3 is a front view of a three-finger gripper mechanism according to the invention. In the background there can be noted the clamping plate 9, which in this case is square. Within it, there are the fastening holes 33 which serve for the mounting of the gripper mechanism to the robot arm. The clamping plate 9 has on its periphery a large bevel which serves for the rapid mounting of the gripper mechanism on the robot arm without screws.

The front clamping plate 8a is hexagonal, hollow in its center, and holds six rods 7 together. On its periphery, three joint supports 23a of the crank 2 of three finger mechanisms are fastened by means of dovetail grooves and blocks. On the other three sides of the front clamping plate 8a of the rods 7 there are fastened three guide members 36 on the side surfaces of which the gripper fingers 6a are guided by plain or anti-friction guides 35 and thereby further stabilized.

Figure 4:
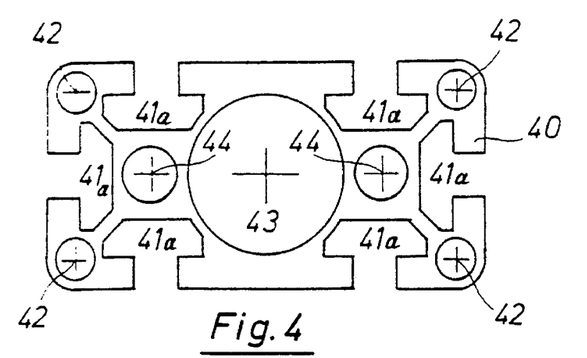
FIGS. 4 to 6 are cross sections through three different structural shapes of the slide of the gripper mechanism of the invention.

FIG. 4 shows the cross section of a quadrilateral structural shape 40 which is suitable for the front clamping plate 8 and for the carriage or slide 4 for the modular application of up to six finger mechanisms. The bore holes 42 or 44 serve for the attachment or passage of the rods 7 on the front clamping plate 8 and through the slide 4. The central bore hole 43 can serve for the arrangement of the actuating unit if the bore holes 44 are too small for this. The grooves 41a serve for the attachment of the joint supports 23 of the links 2, 3 and 5 of the finger mechanisms 2, 3, 5, 6, 23, 24, 25.

Figure 5:
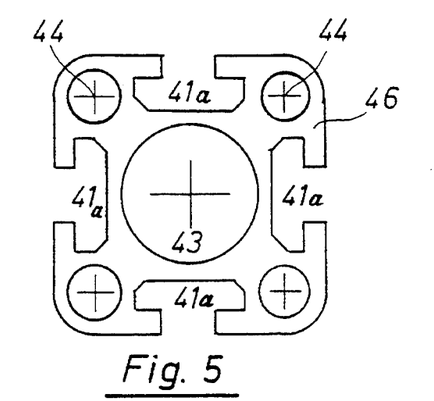

FIG. 5 shows the cross section of a square structural shape 46, as required in accordance with the invention for a two-finger or a square four-finger gripper mechanism.

Figure 6:
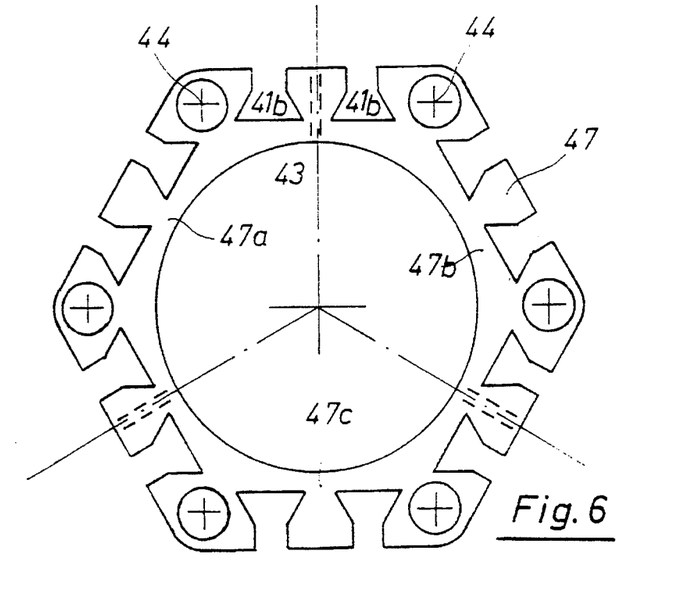

FIG. 6 shows the cross section of a hexagonal structural shape 47 for a two-, three- or six-finger gripper mechanism.

In accordance with the invention, the bore holes 44 are provided for the rods 7. The dovetail grooves 41b serve for the attachment of the finger mechanisms applied as modules. The hexagonal structural shape of the slide 4 can also be divided in longitudinal direction, as shown in dashed line, into three equal parts 47a, 47b, and 47c, in order to actuate three gripper fingers independently of each other. The function of the actuating units are arranged either in the bore holes 44 of the rods 7, as described under FIG. 2, or in the large central bore hole 43.

Figure 7:
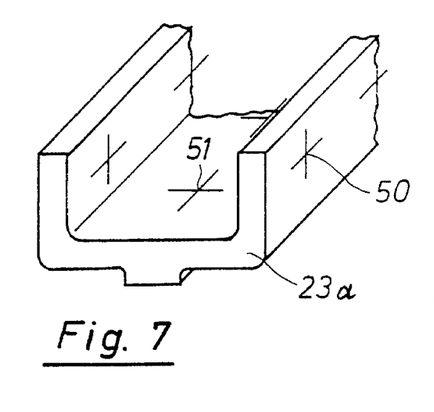
FIGS. 7 to 9 show a portion of the structural shapes of the joint supports of the gripper mechanism of the invention.

FIG. 7 shows a portion of a structural shape 23a which is suitable for the production of the joint supports 23 of narrow type.

The bore holes 50 of the joint pins as well as the bore holes 51 for the attachment of the joint supports 23 to the front clamping plate 8, to the slide 4, and to the gripper finger 6 are preferably prefabricated in the structural shape 23. On the bottom of the U-shape 23, the structural shape protrudes somewhat beyond the flat lower side. This section engages into the corresponding groove of the clamping plate 8, of the slide 4, and of the gripper finger 6 and serves for the transverse stabilizing of the joint supports 23.

Figure 8:
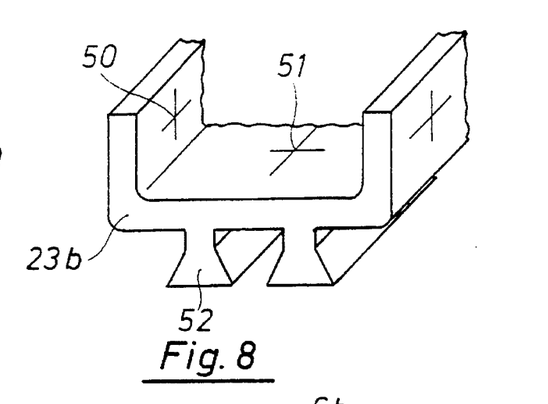

FIG. 8 shows a part of a structural shape 23b for the production of the joint supports 23 of wider type having two dovetail attachment noses 52 which are inserted and fastened in the corresponding grooves of the front clamping plate 8, the slide 4 and the gripper finger 6.

Figure 9:
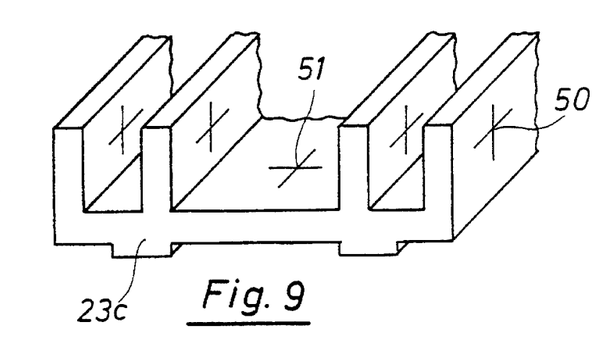

FIG. 9 shows another structural shape, a double-U shape 23c, such as suitable for the joint supports 23 for larger and heavier types. It is fastened by means of slide blocks to the front clamping plate 8, the slide 4 and the gripper finger 6.

Figure 10:
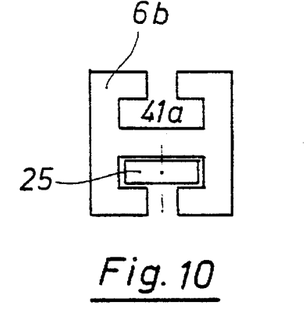
FIG. 10 is a cross section through the structural shape of the gripper finger with a slide block present therein.

FIG. 10 shows a front view of a double-T structural shape 6b which is suitable for the gripper finger 6. In the rectangular groove 41a there is a slide block 25 which serves for the attachment of gripper jaws above or below the gripper finger 6 and also for the attachment of the joint supports 23 on the gripper finger, the front clamping plate 8 and the slide 4.

Figure 11:
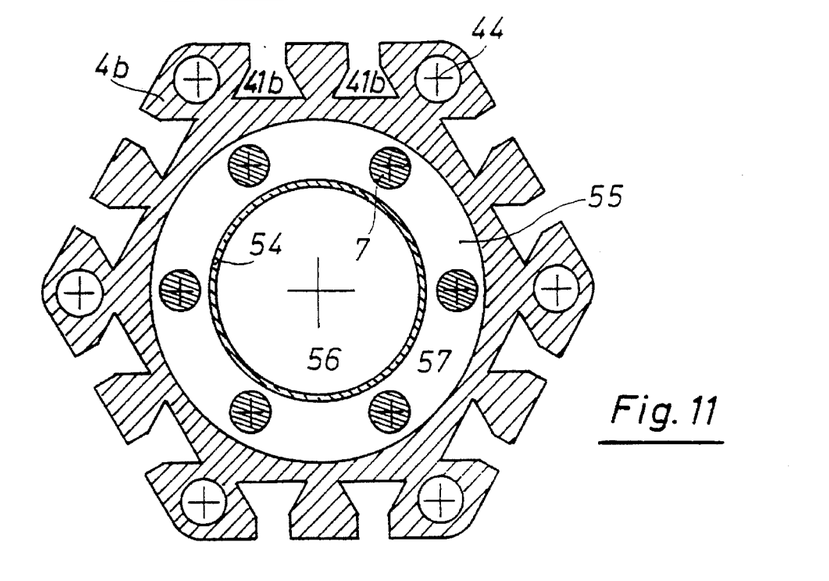
FIG. 11 is a cross section through the hollow cylinder of the gripper mechanism of the invention.

FIG. 11 shows a cross section through the slide joint 1, 4 of the gripper mechanism of the invention with the embodiment comprising the hollow cylindrical actuating unit. The rods 7, which can be hollow, are firmly connected to the annular piston 55. The front clamping plate 8 and the rear clamping plate 9 are not visible. The hexagonal slide 4b is firmly connected to a pipe 54 on its end sides by two bearing rings, not visible here, which have the shape of the annular piston 55. The annular piston 55 divides the hollow cylindrical space of the actuating units in two, the front space 57 being visible. In the center of the slide 4b a large space 56 remains free and can be used for other purposes as already described.

The annular piston 55 and the bearing rings at the end sides of the space 57 may also be of other geometrical cross-sectional shape, such as oval, polygonal, or the like.

Figure 12:
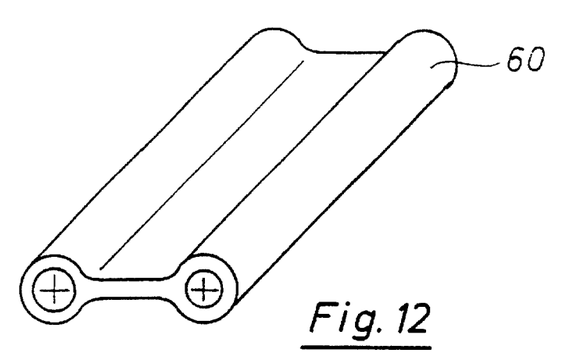
FIG. 12 is a portion of the structural shape of the crank of the slider/crank mechanism of the gripper mechanism of the invention.

FIG. 12 shows a portion of a light-metal or plastic structural shape 60 from which the crank 2 of the slider/crank mechanism 1, 2, 3, 4 of the finger mechanisms can be sawn.

Figure 13:
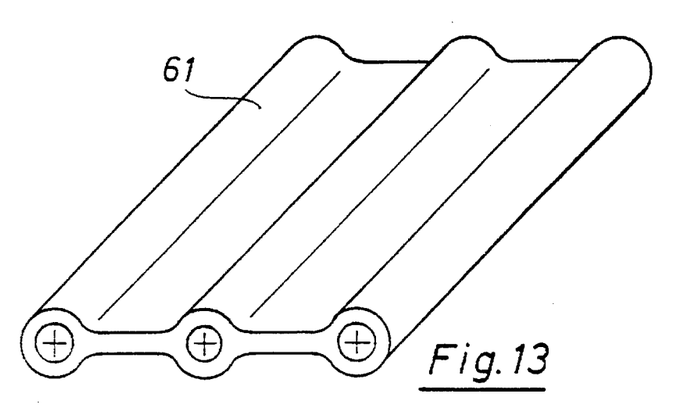
FIG. 13 is a portion of the structural shape of the other links or members of the six-member guide mechanism of the gripper mechanism of the invention.

FIG. 13 shows a portion of a light-metal or plastic structural shape 61 from which the links 3 and 5 of the finger mechanisms are produced. The bore holes in the joints are prefabricated in the structural shape.

Figure 14:
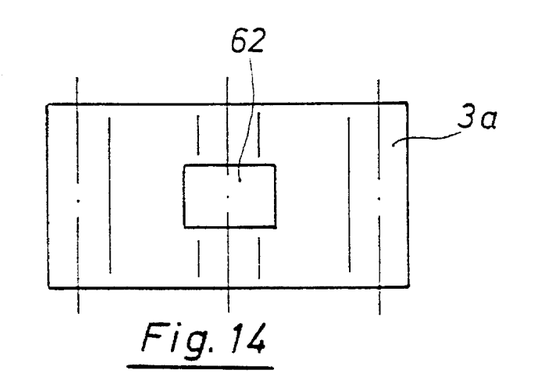
FIG. 14 shows the coupler of the slider/crank mechanism of the gripper mechanism of the invention.

FIG. 14 shows a completed link 3a as required for the coupler 3 of the slider/crank mechanism 1, 2, 3, 4. For the linking of the crank 2 to the coupler 3, a recess 62 is stamped out in the center of the link 3a. This recess can be produced already upon the production of the structural shape 61.

Figure 15:
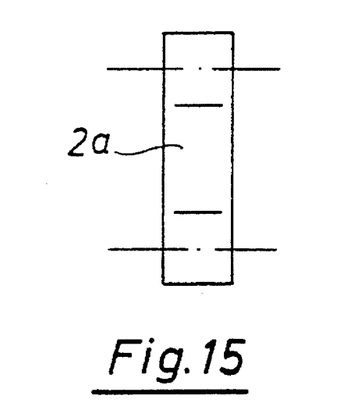
FIGS. 15 and 17 show the crank of the slider/crank mechanism of the gripper mechanism of the invention in narrow and wide embodiment, respectively.

FIG. 15 shows a narrow link 2a, such as sawn off from the structural shape 60 for the crank 2 of the finger mechanism.

Figure 16:
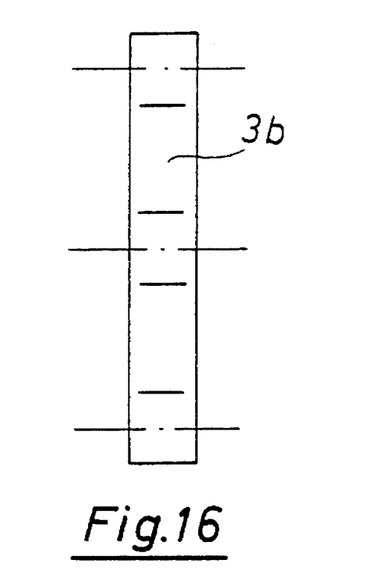
FIGS. 16 and 18 show a link of the link quadrilateral of the six-member guide mechanism of the gripper mechanism of the invention in narrow and wide embodiment, respectively.

FIG. 16 shows a narrow link 3b, two of which can, for instance, be arranged alongside the links 3 and 5 and which engages into the corresponding U-shapes of the joint support 3c in order to replace a wide link.

Figure 17:
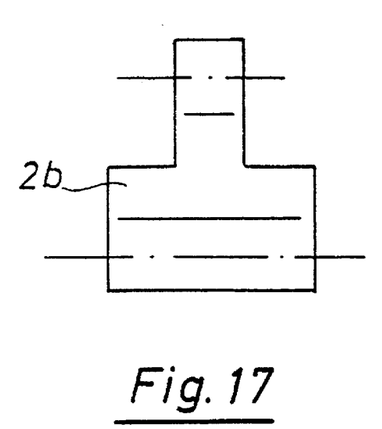

FIG. 17 shows a small link 2b, such as can be shaped in the wider embodiment as crank 2 of the slider/crank mechanism for the finger mechanism 1, 2, 3, 4, 5, 6, 23, 24, 25.

Figure 18:
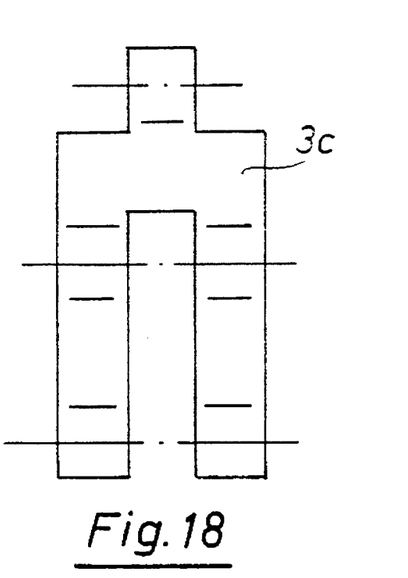

FIG. 18 shows a link 3c, such as can be shaped in the wider embodiment as coupler 3 of the slider/crank mechanism 1, 2, 3, 4 or else as link 5 of the link quadrilateral 3, 4, 5, 6 in such a manner that it engages in wide manner on the bottom of the slide 4 and in narrow manner on the top of the gripper finger 6.

Figure 19:
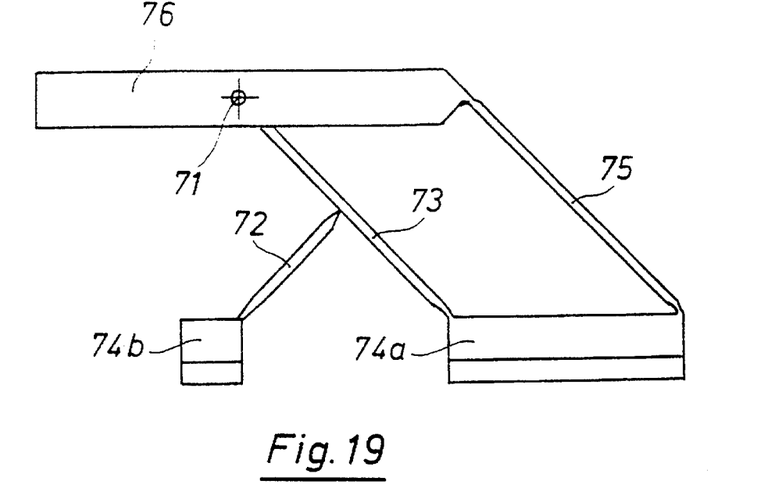
FIG. 19 is a complete finger mechanism of plastic with film joints, such as modularly fastened to the slide joint of the gripper mechanism of the invention.

FIG. 19 shows a complete finger mechanism in assembled condition. The gripper finger 76, link 75, joint supports 74a and 74b, crank 72, link 73 are all cast together from plastic in one piece, for instance in a mold with film joints as hinge, so that, finally, only the joint 71 need be mounted in order to produce the complete finger mechanism. The crank 72 is cut out from the center of the link 73. The joint support 74b is also formed upon the casting on the joint support 74a and is subsequently separated from it.

Figure 20:
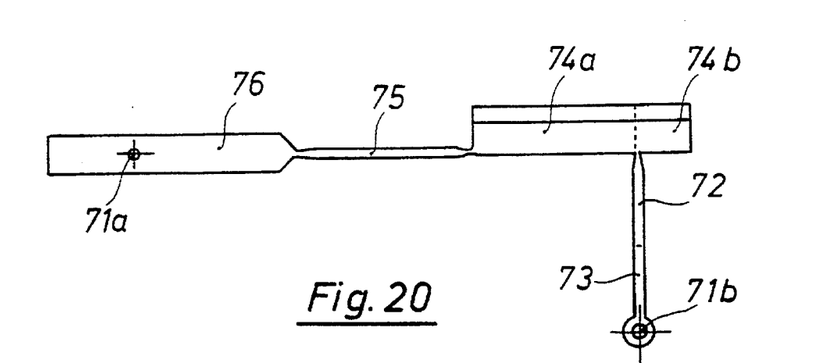
FIG. 20 is a finger mechanism of plastic with film joints in spread condition, not yet placed together.

FIG. 20 shows the finger mechanism of FIG. 19 after removal from the mold, before the joint support 74b has been separated from 74a and the crank 72 cut out from the link 73 and the joint 71b inserted into the corresponding bore hole 71a.

Figure 21:
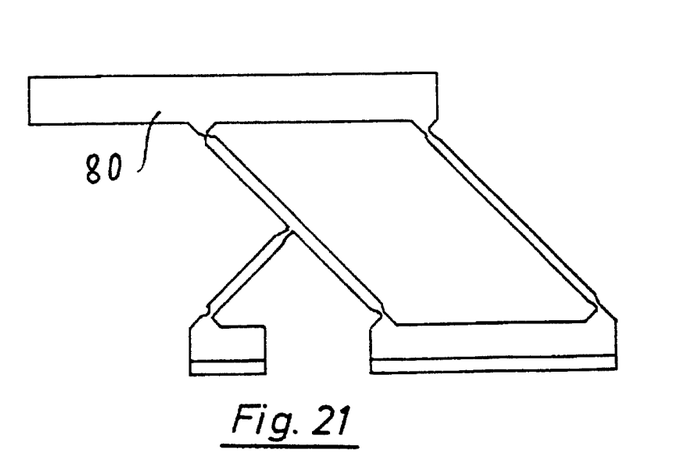
FIG. 21 is a cross section through the structural shape of the complete finger mechanism of plastic with film joints of the modular gripper mechanism of the invention.

FIG. 21 shows a complete finger mechanism of plastic with film joints, as sawn off in disks of desired width from a plastic structural shape 80 of the same cross-sectional shape.

Thus, the invention provides a gripper mechanism which, in light-weight construction, affords all the advantages of a solid gripper mechanism, the number of fingers of which can be modularly increased or reduced depending on the purpose and need, and which can, as a whole, be produced very economically. The prefabricated modules also permit economic series construction, so as economically to broaden the range of gripper mechanisms also based on the size of object. Practically all the parts can be made from prefabricated structural shapes. The drive is also universal, since the gripper mechanism uses a single, preferably linear movement in order to actuate all its gripper fingers.

Figure 22:
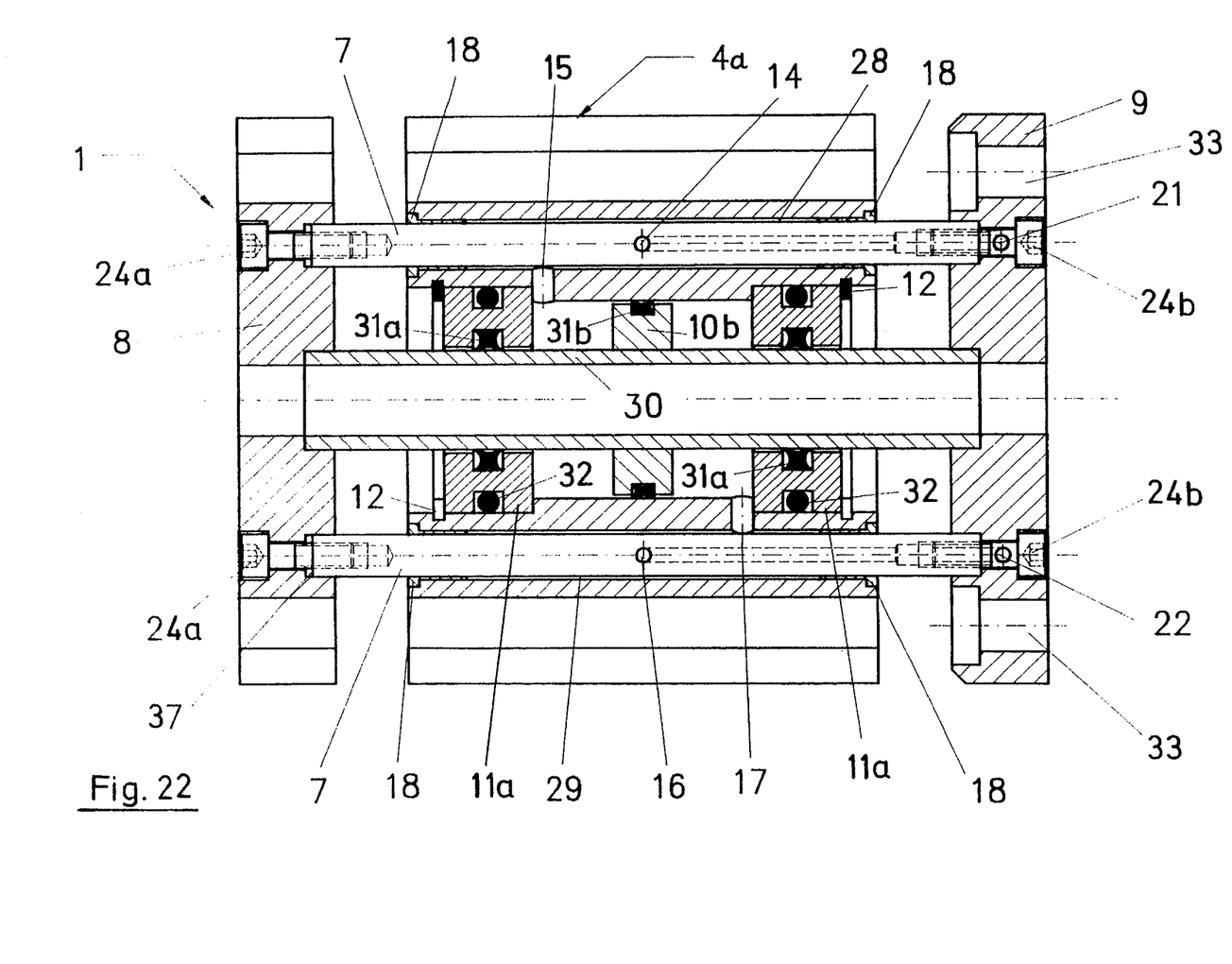
FIG. 22 is a showing of another embodiment of the invention in which the cage has a central hollow clamping body.

The embodiment shown in FIG. 22 has a central clamping member 30.

The front clamping plate 8 is provided on its periphery with attachment grooves and possibilities, such as, for instance dovetail guides to receive the corresponding joint supports (not shown) of the six-member gripper-finger guide mechanism. It consists of a light-metal structural shape and contains suitable bore holes and depressions to receive the clamping body 30 and the slide rods 7.

The rear clamping plate 9, in the same way as the front gripper mechanism front clamping plate 8, contains bore holes and depressions to receive the clamping body 30 and the slide rods 7. In addition, the rear clamping plate 9 has additional bore holes 33, depressions and bevels for the attachment of the gripper mechanism to the robot arm or the manipulator. The feed of the pressure fluid through the bore holes 21, 22 of the screws 24b also takes place via the rear clamping plate 9, although it can also take place via the front clamping plate 8.

The clamping body 30, which is preferably hollow, is placed at about the center of the two clamping plates 8, 9. The clamping plates 8, 9 are clamped against the clamping body 30 by the slide rods 7 by means of screws 24a and 24b. The slide rods 7 still have some clearance or space 37 in their reception bore holes in the clamping plates 8 or 9, so that they can clamp the two clamping plates 8, 9 with sufficient force against the clamping body 30. Several clamping bodies 30 can also be present alongside of each other. Of course, the clamping body or bodies 30 can also clamp the two clamping plates 8, 9 against the slide rod 7 so that the clamping body 30 is acted on in tension and the slide rods in compression.

The cage construction 1 which is thus prestressed represents, in accordance with the invention, a very stable, very flexurally and torsionally stiff slide rod of the slide joint 1, 4 of the gripper mechanism.

The slide rods 7 are made hollow for the feeding of pressure fluid. The pressure fluid passes via the transverse bore holes 14, 16 into the spaces 28 and 29 and from there, via the transverse bore holes 15 and 17, into the annular cylinder spaces and moves the carriage or slide 4 back and forth.

The carriage or slide 4 consists of a light-metal structural shape and is provided on its periphery with attachment grooves and possibilities such as, for instance dovetail guides to receive the corresponding joint supports (not shown) of the six-member gripper-finger guide mechanism.

It slides by means of plain or anti-friction bearings 18 over the slide rods 7. It is hollow on the inside and surrounds the clamping body or bodies 30. The hollow space between the inner wall of the slide 4 and the outer wall of the clamping body 30 is developed as annular cylinder for the actuating of the slide 4. In this connection, the annular piston 10b is fastened to the clamping body 30. The quad ring 31b prevents metallic contact between the annular piston 10b and the inner surface of the slide 4. The quad ring 31b can also contain a magnetic ring which serves for the actuating of a reed relay or approximation switch for the recognition of the position of the gripper.

The end surfaces of the hollow-cylindrical inner space between the slide inner surface and the outer surface of the clamping body 30 close the annular cylinder covers 11a which are fastened by retaining rings 12 to the carriage, and sealed against them by the O-rings 32. Between the annular cylinder covers 11a and the outer surface of the clamping body 30 there is arranged the quad ring 31a which, on the one hand, seals the working cylinder space from the outside and, on the other hand, prevents metallic contact between the cylinder cover 11a and the clamping body 30.

The annular piston 10b can also be fastened to the inner surface of the carriage and be slidingly sealed against the outer surface of the clamping body 30. In this case, the cylinder covers 11a are fastened to the clamping body 30 and slidingly sealed against the carriage inner surface.

The features of the invention disclosed in the above specification, the drawing, and the claims can be of importance, both individually and in any desired combination, for the reduction to practice of the invention. All features disclosed are essential to the invention. The disclosure of the corresponding/attached priority papers (copy of the prior application) is herewith also included in its entirety in the disclosure of the application.

I claim:

1. A gripper mechanism for a manipulator, having at least one movable gripper finger swingable around a slide axis, as a coupler of a kinematically multi-member positive guide mechanism, the positive guide mechanism comprising at least one slider/crank mechanism as an actuating unit which has a crank acting at one end on a first link and pivoted at the other end on a slide rod assembly, a second link spaced apart from the first link, and a slide which is guided on the slide rod assembly and abuts against the first link and the second link, both of said links of the guide mechanism acting on the gripper finger, the slide rod assembly carrying out no movement in the direction of the slide axis upon the movement of the gripper, and wherein said slide rod assembly is formed of several decentrally arranged slide rods as a cage, and said slide extends along an axis of the cage to stabilize the cage.

2. A gripper mechanism according to claim 1, wherein the slide is arranged for sliding as a carriage on the rods.

3. A gripper mechanism according to claim 1, further comprising prestressed clamping plates arranged on the end side of the rods.

4. A gripper mechanism according to claim 3, further comprising a body which is clamped by the rods between the clamping plates.

5. A gripper mechanism according to claim 4, further comprising a central arrangement of the body.

6. A gripper mechanism according to claim 4, wherein the body is a hollow body.

7. A gripper mechanism according to claim 4, wherein the body forms a piston.

8. A gripper mechanism according to claim 1, further comprising a piston rod which is arranged centrally in the cage and which extends fixed in position within a cylinder associated with the slide.

9. A gripper mechanism according to claim 1, wherein the slide is of multipartite form.

10. A gripper mechanism according to claim 1, further comprising bearings disposed in said slide rod assembly for lateral guidance and stabilization of said at least one gripper finger.

11. A gripper mechanism according to claim 1, wherein said gripper finger and said first link and said second link and said slide are integrally formed from a plastic element, said plastic element including film joints disposed at respective points of interconnection between said finger and said first and said second joints and between said slide and said first and said second joints.

12. A gripper mechanism for a manipulator, having at least one movable gripper finger swingable around a slide axis, as a coupler of a kinematically multi-member positive guide mechanism, the positive guide mechanism comprising at least one slider/crank mechanism as an actuating unit which has a crank acting at one end on a first link and pivoted at the other end on a slide rod assembly, and a slide which is guided on the slide rod assembly and abuts against the first link, a second link, both said first and said second links of the guide mechanism acting on the gripper finger, the slide rod assembly carrying out no movement in the direction of the slide axis upon the movement of the gripper, and wherein said slide rod assembly is formed of plural slide rods decentrally arranged as a cage; and wherein the slide rods are hollow.

13. A gripper mechanism according to claim 12, further comprising a prestressed threaded rod which extends into one of the slide rods.

14. A gripper mechanism for a manipulator, having at least one movable gripper finger swingable around a slide axis, as a coupler of a kinematically multi-member positive guide mechanism, the positive guide mechanism comprising at least one slider/crank mechanism as an actuating unit which has a crank acting at one end on a first link and pivoted at the other end on a slide rod assembly, and a slide which is guided on the slide rod assembly and abuts against the first link, a second link, both said first and said second links of the guide mechanism acting on the gripper finger, the slide rod assembly carrying out no movement in the direction of the slide axis upon the movement of the gripper, and wherein said slide rod assembly is formed of plural slide rods decentrally arranged as a cage; and the slide includes a cylinder, and the gripper mechanism further comprises a piston rod which is arranged centrally in the cage and extends fixed in position within the cylinder; and the slide rods are hollow and developed as pressure fluid feed to the cylinder.

* * * * *